(12) United States Patent
Huh et al.

(10) Patent No.: US 11,030,996 B2
(45) Date of Patent: Jun. 8, 2021

(54) ELECTRONIC DEVICE AND CONTROL METHOD THEREOF

(71) Applicant: LG ELECTRONICS INC., Seoul (KR)

(72) Inventors: Jiyoung Huh, Seoul (KR); Jongcheol Shin, Seoul (KR); Sunryang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 16/098,366

(22) PCT Filed: Oct. 14, 2016

(86) PCT No.: PCT/KR2016/011533
§ 371 (c)(1),
(2) Date: Nov. 1, 2018

(87) PCT Pub. No.: WO2017/191874
PCT Pub. Date: Nov. 9, 2017

(65) Prior Publication Data
US 2019/0164536 A1 May 30, 2019

(30) Foreign Application Priority Data

May 3, 2016 (KR) .................. 10-2016-0054767

(51) Int. Cl.
*G06F 16/00* (2019.01)
*G10L 15/28* (2013.01)
(Continued)

(52) U.S. Cl.
CPC .............. *G10L 15/06* (2013.01); *G06F 16/00* (2019.01); *G10L 15/22* (2013.01); *G10L 15/28* (2013.01); *H04R 19/04* (2013.01); *H04W 4/00* (2013.01)

(58) Field of Classification Search
CPC ......... G10L 15/06; G10L 15/28; G10L 15/22; H04R 19/04; H04W 4/00
See application file for complete search history.

(56) References Cited

U.S. PATENT DOCUMENTS

2004/0236574 A1* 11/2004 Ativanichayaphong ..................... G06F 3/167
704/231
2008/0037433 A1* 2/2008 Sotack .............. H04M 1/72538
370/242

(Continued)

FOREIGN PATENT DOCUMENTS

JP H08-138180 5/1996
KR 10-2012-0092762 8/2012
(Continued)

OTHER PUBLICATIONS

European Search Report dated Nov. 21, 2019 issued in EP Application No. 16901100.4.
(Continued)

*Primary Examiner* — Sonia L Gay
(74) *Attorney, Agent, or Firm* — KED & Associates LLP

(57) ABSTRACT

The present invention relates to an electronic device and a control method thereof. The electronic device comprises a microphone for acquiring sound; and a control unit for determining whether the acquired sound is a learned sound and outputting information on the acquired sound on the basis of a determination result.

8 Claims, 15 Drawing Sheets

(51) Int. Cl.
    *G10L 15/06*     (2013.01)
    *G10L 15/22*     (2006.01)
    *H04R 19/04*     (2006.01)
    *H04W 4/00*     (2018.01)

(56) References Cited

U.S. PATENT DOCUMENTS

| | | |
|---|---|---|
| 2011/0206345 A1 | 8/2011 | Masuo |
| 2012/0224706 A1* | 9/2012 | Hwang ............... G10L 25/00 |
| | | 381/56 |
| 2015/0348400 A1 | 12/2015 | Zribi et al. |
| 2016/0117905 A1* | 4/2016 | Powley ............... G08B 21/18 |
| | | 340/521 |
| 2016/0364963 A1* | 12/2016 | Matsuoka ............ G10L 25/51 |
| 2017/0004684 A1* | 1/2017 | Slater ................. G08B 5/224 |
| 2017/0228240 A1* | 8/2017 | Khan .................. H04L 67/42 |
| 2017/0309142 A1* | 10/2017 | Phillips ............... G08B 7/066 |
| 2019/0162434 A1* | 5/2019 | Matsuoka .......... G05D 23/1917 |

FOREIGN PATENT DOCUMENTS

| | | |
|---|---|---|
| KR | 10-2014-0028784 | 3/2014 |
| KR | 10-2014-0074129 | 6/2014 |
| WO | WO 2016/052018 | 4/2016 |

OTHER PUBLICATIONS

International Search Report (with English Translation) and Written Opinion dated Jan. 31, 2017 issued in Application No. PCT/KR2016/011533.

\* cited by examiner

ELECTRONIC DEVICE AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2016/011533, filed Oct. 14, 2016, which claims priority to Korean Patent Application No. 10-2016-0054767, filed May 3, 2016, whose entire disclosures are hereby incorporated by reference.

TECHNICAL FIELD

The present invention relates to an electronic device and control method thereof, and more particularly, to an electronic device and control method thereof, suitable for recognizing sound and providing information on the recognized sound.

BACKGROUND ART

A device configured to behave by making self-decision according to a predetermined rule is called a robot. The robot may mean a device configured to simply performing a prescribed operation for itself or a device configured to operate based on a recognized information by self-recognizing a situation or environment.

Thus, a robot has been already capable of behaving by making a behavior plan of high level enough to exclude human intervention owing to the development of artificial intelligence and is currently used for various fields.

As a voice recognition function has been developed, a robot recognizes user's voice, responds to the recognized voice, and performs a function or operation according to a voice command.

Recently, various devices notify some information or states through numerous notification sounds. A user eventually hears numerous notification sounds a day but has difficulty in memorizing each meaning indicated by the notification sound, thereby causing a problem that the user has difficulty in accurately recognizing the corresponding notification sound.

As the devices used by a user and the devices around the user increase, the types of notification sound increase as well. Thus, there is a problem that it is difficult to recognize the increasing notification sounds one by one.

DISCLOSURE OF THE INVENTION

Technical Tasks

One technical task achieved by the present invention is to recognize various sounds around and provide information on the recognized sounds.

Another technical task achieved by the present invention is to learn to obtain information on a recognized sound and store the learned information, in case of absence of the information on the recognized sound.

Further technical task achieved by the present invention is to determine a user to deliver a recognized sound and provide information on the recognized sound to the determined user.

Technical Solutions

In one technical aspect of the present invention, provided herein is a method of operating an electronic device including a microphone, the method including obtaining a sound through the microphone, determining whether the obtained sound is a learned sound, and outputting information on the obtained sound based on a result of the determination.

In another technical aspect of the present invention, provided herein is an electronic device, including a microphone obtaining a sound and a controller configured to determine whether the obtained sound is a learned sound and output information on the obtained sound based on a result of the determination.

Advantageous Effects

An electronic device according to various embodiments of the present invention, can recognize various sounds around and provide information on the recognized sounds.

If there is no information on a recognized sound, the present invention can learn to obtain the information on the recognized sound and store the learned information. Therefore, the present invention stores a non-stored sound through learning as well as a pre-stored sound, thereby providing information on the learned sound.

Moreover, the present invention determines a user to deliver a recognized sound thereto and provide information on the recognized sound to the determined user.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

An electronic device disclosed in the present specification may include a terminal such as a mobile phone, a smartphone, a laptop computer, a digital broadcast terminal, a PDA (personal digital assistants), PMP (portable multimedia player), a navigation, a slate PC, a tablet PC, an ultrabook, a wearable device (e.g., a smartwatch, a smart glass, a head mounted display) (HMD), etc.). An electronic device disclosed in the present specification may include a machine capable of autonomously processing or operating a prescribed job like a robot. The robot included in the electronic device described in the present specification may be a fixed type, a mount type, or a mobile type. And, the mobile-type robot may be configured to move autonomously.

Figure 1:
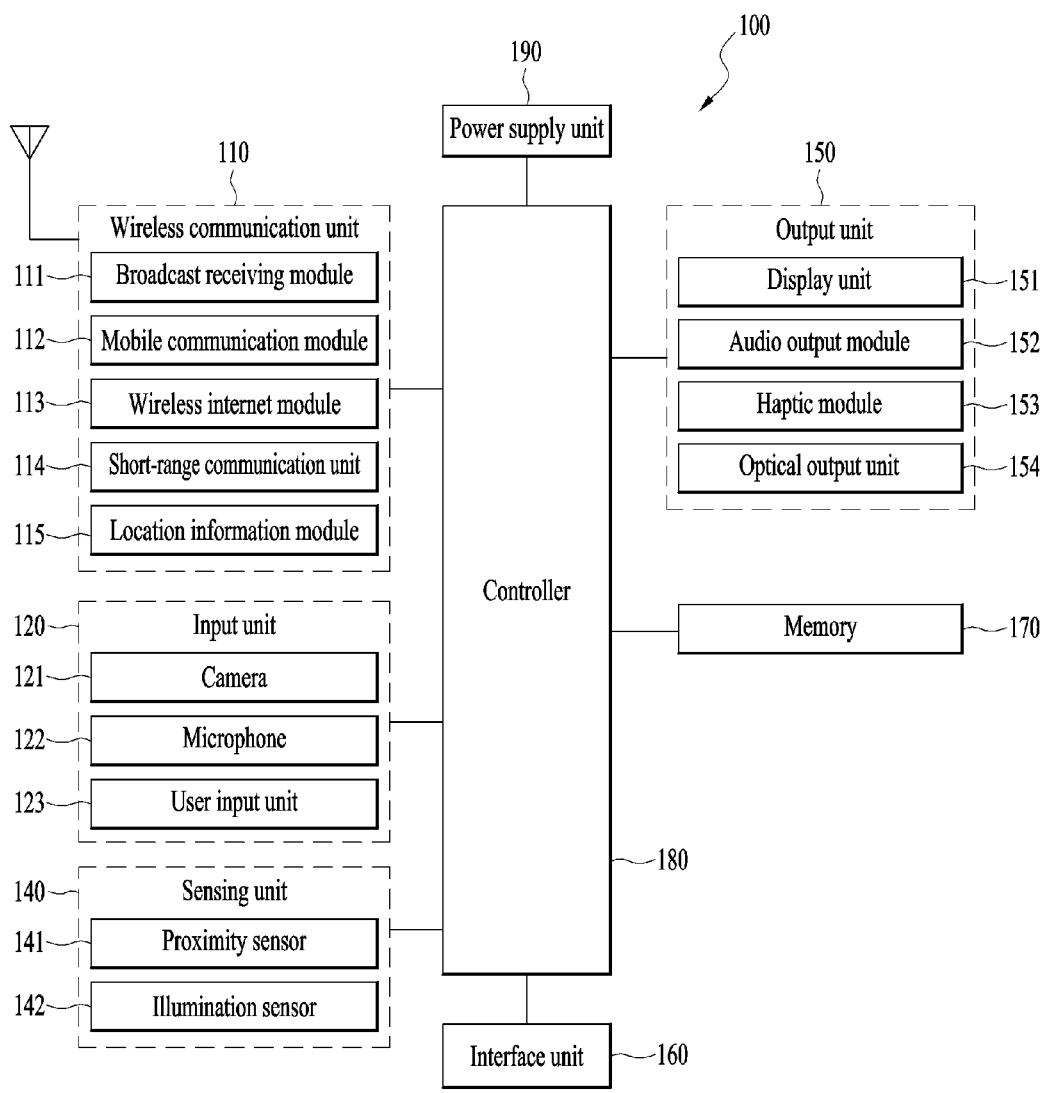
FIG. 1 is a block diagram to describe an electronic device in association with the present invention.

FIG. 1 is a block diagram to describe an electronic device in association with the present invention.

An electronic device 100 may include a wireless communication unit 110, an input unit 120, a sensing unit 140, an output unit 150, an interface unit 160, a memory 170, a controller 180, a power supply unit 190 and the like. As the components shown in FIG. 1 are not mandatory for implementation of the electronic device, the electronic device mentioned in the present specification may have components more or less than the above-listed components.

Particularly, the wireless communication unit 100 among the components may include at least one module capable of enabling a wireless communication between the electronic device 100 and a wireless communication system, between the electronic device 100 and another electronic device, or between the electronic device 100 and an external server. And, the wireless communication unit 110 may include at least one module configured to connect the electronic device 100 to at least one network.

The wireless communication unit 110 may include at least one of a broadcast receiving module 111, a mobile communication module 112, a wireless internet module 113, a short range communication module 114, a location information module 115 and the like.

The input unit 120 includes a camera 121 for obtaining images or video, a microphone 122, which is one type of audio input device for inputting an audio signal, and a user input unit 123 (e.g., a touch key, a push key, a mechanical key, a soft key, etc.) for allowing a user to input information. Audio or image data collected by the input unit 120 may be analyzed and processed into a user's control command.

The sensing unit 140 is typically implemented using one or more sensors configured to sense internal information of the electronic device, the surrounding environment information of the electronic device, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., see a camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The electronic device may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touchscreen. The touchscreen may provide an output interface between the electronic device 100 and a user, as well as function as the user input unit 123 which provides an input interface between the electronic device 100 and the user.

The interface unit 160 serves as an interface with various types of external devices that can be coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the interface unit 160.

The memory 170 is typically implemented to store data to support various functions or features of the electronic device 100. The memory 170 may be configured to store application programs (or applications) executed in the electronic device 100, data or instructions for operations of the electronic device 100, and the like. Some of these application programs may be downloaded from an external server via wireless communication. Other application programs may be installed within the electronic device 100 at time of manufacturing or shipping, which is typically the case for basic functions of the electronic device 100 (e.g., receiving a call, placing a call, receiving a message, sending a message, etc.). It is common for application programs to be stored in the memory 170, installed on the electronic device 100, and executed by the controller 180 to perform an operation (or function) of the electronic device 100.

The controller 180 typically functions to control overall operation of the electronic device 100, in addition to the operations associated with the application programs. The controller 180 may provide or process information or functions appropriate for a user by processing signals, data, information and the like, which are input or output through the various components depicted above, or activating application programs stored in the memory 170.

And, the controller 180 may control some or all of the components illustrated in FIG. 1 to launch an application program stored in the memory 170. Moreover, the controller 180 may activate at least two of the components included in the electronic device to launch the application program.

The power supply unit 190 can be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least one portion of the above-mentioned components can cooperatively operate to implement operations, controls or controlling methods of the electronic device according to various embodiments mentioned in the following description. And, the operations, controls or controlling methods of the electronic device can be implemented on the mobile terminal by running at least one or more application programs saved in the memory 170.

In the following, prior to describe various embodiments implemented through the aforementioned electronic device 100, the above-listed components shall be described in detail with reference to FIG. 1.

First of all, regarding the wireless communication unit 110, the broadcast receiving module 111 of the wireless communication unit 110 is typically configured to receive a broadcast signal and/or broadcast associated information from an external broadcast managing entity via a broadcast channel. The broadcast channel may include a satellite channel, a terrestrial channel, or both. Two or more broadcast receiving modules 111 may be utilized to facilitate simultaneously receiving of two or more broadcast channels, or to support switching among broadcast channels.

The broadcast management server may mean a server which generates and transmits a broadcast signal and/or broadcast associated information, or a server which receives a pre-generated broadcast signal and/or broadcast associated information, and sends such items to a terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to at least one of technical standards (or broadcasting systems (e.g., ISO, IEC, DVB, ATSC, etc.) for transmission and reception of digital broadcast signals. The broadcast receiving module 111 can receive the digital broadcast signals using the system appropriate for the technical specifications according to the technical standards.

The broadcast associated information may include information associated with a broadcast channel, a broadcast program, a broadcast service provider, or the like. The broadcast associated information may also be provided via a mobile communication network, and in this case, received by the mobile communication module 112.

The broadcast associated information may be implemented in various formats such as Electronic Program Guide (EPG) of Digital Multimedia Broadcasting (DMB), Electronic Service Guide (ESG) of Digital Video Broadcast-Handheld (DVB-H), and the like. Broadcast signals and/or broadcast associated information received via the broadcast receiving module 111 may be stored in the memory 170.

The mobile communication module 112 can transmit/receive wireless signals to/from one or more network entities. Typical examples of a network entity include a base station, an external terminal, a server, and the like. Such network entities form part of a mobile communication network, which is constructed according to technical standards or communication methods for mobile communications (e.g., Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of the wireless signals may include audio call signals, video call signals, or various formats of data according to communication of text and multimedia messages.

The wireless Internet module 113 is configured to facilitate wireless Internet access. This module may be internally or externally coupled to the electronic device 100. The wireless Internet module 113 may be configured to transmit and/or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies not listed above as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device 100, or communications between the electronic device and a network where another electronic device 100 (or an external server) is located, via wireless area networks. One example of the wireless area networks is a wireless personal area networks.

In some embodiments, another electronic device 100 may include a wearable device, for example, a smart watch, a smart glass or a head mounted display (HMD), which is able to exchange data with the electronic device 100 (or otherwise cooperate with the electronic device 100). The short-range communication module 114 may sense (or recognize) the wearable device, and permit communication between the wearable device and the electronic device 100. In addition, when the sensed wearable device is a device which is authenticated to communicate with the electronic device 100, the controller 180, for example, may cause transmission of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to obtain a position (or a current position) of the electronic device. As an example, the location information module 115 includes a Global Position System (GPS) module, a Wireless Fidelity (Wi-Fi) module, or both. As one example, when the electronic device uses a GPS module, a position of the electronic device may be obtained using a signal sent from a GPS satellite. As another example, when the electronic device uses the Wi-Fi module, a position of the electronic device can be obtained based on information related to a wireless access point (AP) which transmits or receives a wireless signal to or from the Wi-Fi module. If necessary, the location information module 115 nay perform a prescribed function of one of other modules of the wireless communication unit to obtain data of a position of the electronic device substitutingly or additionally. The location information module 115 is a module used to obtain a position (or a current position) of the electronic device and is non-limited to a mobile configured to directly calculate or obtain a position of the electronic device.

Next, the input unit 120 may be configured to permit various types of inputs such as image information (or signal), audio information (or signal), data, and information inputted from a user. For the input of the image information, the electronic device 100 may include one or more cameras 121. Such cameras 121 may process image frames of still pictures or video obtained by image sensors in a video call mode or a shot mode. The processed image frames can be displayed on the display unit 151 or stored in memory 170. In some cases, a plurality of the cameras 121 provided to the electronic device 100 may be disposed in a matrix configuration to permit a plurality of image informations having various angles or focal points to be inputted to the electronic device 100. As another example, a plurality of the cameras 121 may be located in a stereoscopic arrangement to obtain right and left images for implementing a stereoscopic image.

The microphone 122 processes an external sound signal into electric audio data. The processed audio data can be utilized in various manners according to the function currently performed (or the application program currently executed) in the electronic device 100. If desired, the microphone 122 may include assorted noise removing algorithms to remove unwanted noise generated in the course of receiving the external audio signal. Moreover, the microphone 122 may include a plurality of microphones.

Besides, the microphone 122 may process an external sound signal attributed to a proximity or contact touch into electric audio data.

The user input unit 123 is configured to receive an input of information from a user. If information is inputted through the user input unit 123, the controller 180 can control an operation of the electronic device 100 to correspond to the inputted information. The user input unit 123 may include one or more of a mechanical input means (or a mechanical key (e.g., a button located on a front and/or rear surface or a side surface of the electronic device 100, a dome switch, a jog wheel, a jog switch, etc.)) and a touch-sensitive input means. As one example, the touch-sensitive input means may include a virtual key, a soft key or a visual key, which is displayed on a touchscreen through software processing, or a touch key disposed on the electronic device except the touchscreen. Meanwhile, the virtual or visual key can be displayed on the touchscreen in various forms, for example, graphic, text, icon, video, or a combination thereof.

The sensing unit 140 is generally configured to sense one or more of internal information of the electronic device, surrounding environment information of the electronic device, and user information and generate a corresponding sensing signal. Based on the sensing signal, the controller 180 may control the activation or operation of the electronic device 100 or perform data processing, function or operation in association with an application program installed on the electronic device 100. The sensing unit 140 may be implemented using any of a variety of sensors, some of which will now be described in more detail as follows.

First of all, the proximity sensor 141 may include a sensor to sense presence or absence of an object approaching a surface, or an object located near a surface, by using an electromagnetic field, infrared rays, or the like without a mechanical contact. The proximity sensor 141 may be disposed in an inner region of the electronic device enclosed by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 141 can be configured to sense proximity of a pointer relative to the touchscreen by changes of an electromagnetic field, which is responsive to an approach of an object with conductivity. In this case, the touchscreen (or touch sensor) may also be categorized as a proximity sensor.

For clarity of description, the term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 141 may sense proximity touch, and proximity touch patterns (e.g., proximity touch distance, proximity touch direction, proximity touch speed, proximity touch time, proximity touch position, proximity touch moving status, etc.). In some implementations, as described above, the controller 180 may process data (or information) corresponding to proximity touches and proximity touch patterns sensed by the proximity sensor 141, and output visual information corresponding to the processed data to the touchscreen. In addition, the controller 180 can control the electronic device 100 to execute different operations or process different data according to whether a touch to a same point on the touchscreen is a proximity touch or a contact touch.

A touch sensor can sense a touch (or a touch input) applied to the touchscreen (or the display unit 151) using any of a variety of touch types. Examples of such touch types include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

Thus, when a touch input is sensed by a touch sensor, a corresponding signal(s) may be sent to a touch controller. The touch controller may process the received signal(s), and then transmit corresponding data to the controller 180. Accordingly, the controller 180 may sense which region of the display unit 151 has been touched, etc. Here, the touch controller may include a component separate from the controller 180 or the controller 180 itself.

In some embodiments, the controller 180 may execute the same or different controls according to a type of touch object that touches the touchscreen (or a touch key provided to a location other than the touchscreen). Whether to execute the same or different control according to the object which provides a touch input may be determined based on a current operating state of the electronic device 100 or a currently executed application program, for example.

The aforementioned touch sensor and the aforementioned proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

An ultrasonic sensor may be implemented to recognize position information relating to a touch object using ultrasonic waves. The controller 180 may calculate a position of a wave generation source based on information sensed by an optical sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. In detail, the position of the wave generation source may be calculated using the time difference from the time that the ultrasonic wave reaches the sensor based on the light as a reference signal.

Meanwhile, the camera 121 described as a component of the input unit 120 may include at least one of a camera sensor (e.g., CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the electronic device 100. For example, the display unit 151 may display a running screen information of an application program run in the electronic device 100 or User Interface (UI) and Graphic User Interface (GUI) information according to the running screen information.

In some embodiments, the display unit 151 may be implemented as a stereoscopic display unit for displaying stereoscopic images.

A typical stereoscopic display unit may employ a 3D display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data received from the wireless communication unit 110 or audio data stored in the memory 170 in call signal reception mode, call mode, record mode, voice recognition mode, broadcast reception mode, or the like. The audio output module 152 may output sound signals related to a function (e.g., a call signal reception sound, a message reception sound, etc.) performed by the electronic device 100. The audio output module 152 may include a receiver, a speaker, a buzzer, and the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 can output a signal for indicating an event generation using light of a light source. Examples of events generated in the electronic device 100 may include message reception, call signal reception, a missed call, an alarm, a schedule notice, an email reception, information reception through an application, and the like.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as a passage to all external devices connected to the electronic device 100. The interface unit 160 may receive data transmitted from an external device, receive power to transfer to elements and components within the electronic device 100, or transmit internal data of the electronic device 100 to such an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, and the like.

The identification module is a chip that stores various informations for authenticating authority of using the electronic device 100, and may include User Identity Module (UIM), Subscriber Identity Module (SIM), Universal Subscriber Identity Module (USIM), and the like. In addition, a device having the identification module (also referred to hereinafter as an "identifying device") may be manufactured as a smart card. Accordingly, the identifying device can be connected with the terminal 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the electronic device there through. Various command signals or power input from the cradle may operate as signals for recognizing that the electronic device is properly mounted on the cradle.

The memory 170 can store programs to support operations of the controller 180 and store input/output data (e.g., phonebook, messages, still images, videos, etc.). The memory 170 may store data related to various patterns of vibrations and audio which are output in response to touch inputs on the touchscreen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a network storage device that performs the storage function of the memory 170 over a network, such as the Internet.

As describe above, the controller 180 controls operations related to application programs and typically controls overall operations of the electronic device 100. For example, the controller 180 may execute or release a lock state of restricting an input of a user's control command for applications if a status of the electronic device meets a preset condition.

Moreover, the controller 180 can perform the control and processing associated with voice calls, data communications, video calls, and the like, or perform pattern recognition processing to recognize a handwriting input and a picture drawing input performed on the touchscreen as a text and an image, respectively. Furthermore, the controller 180 can control one or a combination of the above-described components in order to implement various embodiments described in the following on the electronic device 100 according to the present invention.

Moreover, the controller 180 can determine an external sound signal according to a proximity or contact touch based on a sound or audio signal obtained through the microphone 122. The controller 180 may determine a function corresponding to an audio signal pattern according to the obtained audio signal and then control the electronic device 100 to perform the determined function.

The controller 180 can obtain a voice command through the voice microphone 122 and recognize the voice according to the obtained voice command. And, the controller 180 can perform a function according to the recognized voice command.

The power supply unit 190 may receive external power or internal power and supply the appropriate power required for operating respective elements and components included in the electronic device 100 under the control of the controller 180. The power supply unit 190 may include a battery, which is typically rechargeable, or be detachably attached to the terminal body for charging, etc.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described in the following may be implemented in a computer-readable recording medium or a similar recording medium using software, hardware, or any combination thereof for example.

Figure 2:
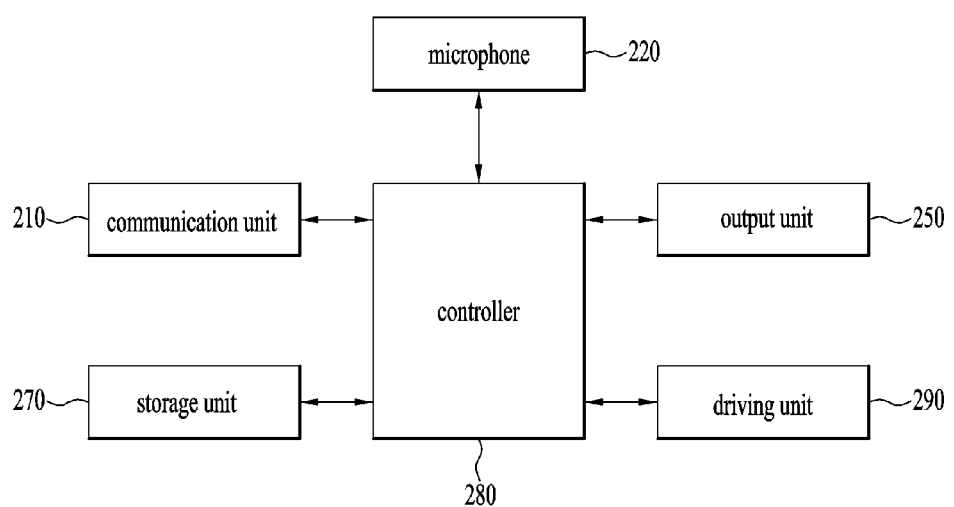
FIG. 2 is a block diagram for the configuration of an electronic device according to one embodiment of the present invention.

FIG. 2 is a block diagram for the configuration of an electronic device according to one embodiment of the present invention.

Referring to FIG. 2, an electronic device 200 may include a communication unit 210, a microphone 220, an output unit 250, a storage unit 270, a controller 280 and a driving unit 290. Some of the components included in the electronic device 200 may be removed or other components may be further included therein. The electronic device 200 may include the former electronic device 100, whereby some of the components of the former electronic device 100 may be included in the latter electronic device 200.

The communication unit 210 may include at least one module capable of enabling a wireless communication between the electronic device 200 and a wireless or wired communication system, between the electronic device 100 and another electronic device 100/200, or between the electronic device 200 and an external server. And, the communication unit 210 may correspond to the former wireless communication unit 110.

The microphone 200 processes a sound signal into an electric audio data. For instance, the microphone 200 can process an external sound signal into an audio signal corresponding to an electric audio data. As the microphone 220 can include a plurality of microphones, it is able to obtain equal or different sound signals through a plurality of the microphones, respectively. The microphone 220 may correspond to the former microphone 122.

The output unit 250 may include a display unit 251 configured to output an image or video and an audio output unit 252 configured to output an audio or sound.

The display unit 251 may display (or output) information processed by the electronic device 200. For example, the display unit 251 may display a running screen information of an application program currently run in the electronic device 200 or UI/GUI (user interface/graphic user interface) information according to the running screen information. And, the display unit 251 may correspond to the former display unit 151.

The audio output unit 252 may output various audio data. For instance, the audio output unit 252 may output an audio signal related to a function performed in the electronic device 200. And, the audio output unit 252 may correspond to the former audio output module 152. The audio output unit 252 may include a receiver, a speaker, a buzzer and the like.

The storage unit 270 can store data for supporting various functions of the electronic device 200. For instance, the storage unit 270 can store data for a function corresponding to a recognized voice or data for a function corresponding to an audio signal pattern. The storage unit 270 may store information corresponding to sound or a history of information according to obtained sound. The storage unit 270 may correspond to the former memory 170.

The controller 280 may control an operation related to an application program and overall operations of the electronic device 200. For instance, the controller 280 may obtain information on obtained sound. The controller 280 can provide information on the obtained sound. If failing to obtain information on the obtained sound, the controller 280 can learn the information on the obtained sound. And, the controller 280 may save the learned information in a manner of matching the corresponding information to the obtained sound. This shall be described later.

The controller 280 may include at least one processor and correspond to the former controller 180.

The driving unit 290 may drive the electronic device 200 to move. Hence, the electronic device 200 can move in response to the drive of the driving unit 290. For instance, the driving unit 290 may include at least one motor and drive the electronic device 200 to move by operating the included motor.

Figure 3:
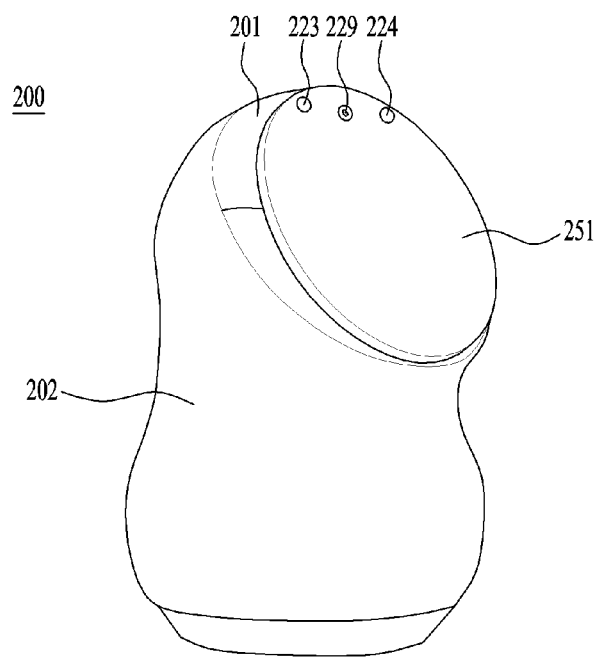
FIG. 3 is a perspective diagram of an electronic device according to one embodiment of the present invention.

FIG. 3 is a perspective diagram of an electronic device according to one embodiment of the present invention.

Referring to FIG. 3, an electronic device 200 may have a body of a curved cylindrical shape, by which the present invention may be non-limited. For example, the body may have a bar shape, an oval shape, a ball shape, an animal shape, a humanoid shape similar to a human shape, or the like.

The electronic device 200 may include at least one case (e.g., frame, housing, cover, etc.) configuring an exterior of the electronic device 200. For instance, the electronic device 200 may include a first case 201 of a top side and a second case 202 of a bottom side. Various electronic parts may be disposed in an inner space formed by coupling the first and second cases 201 and 202 together. The disposed electronic parts may include at least one of the aforementioned components.

A display unit 251 is disposed on a front side of the electronic device 200. A window of the display unit 251, as shown in the drawing, is installed in the first case 201 to configure a portion of a front side of the electronic device body together with the first case 201.

A speaker (not shown) included in the audio output unit 252 may be disposed one lateral side of the electronic device 200. The speaker (not shown) may be externally exposed or not.

A camera 229 and a microphone 220 may be disposed on the front side of the electronic device 200. In this case, the microphone 220 may include a plurality of microphones 221 to 224. For instance, a third microphone 223 and a fourth microphone 224 can be disposed on the front side of the electronic device 200, while a first microphone 221 and a second microphone 222 can be disposed on the top side of the electronic device 200. This is described with reference to FIG. 4.

Figure 4:
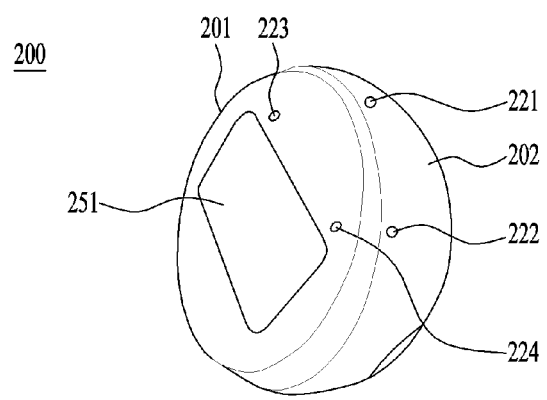
FIG. 4 is a perspective diagram for partial configuration of an electronic device according to one embodiment of the present invention.

FIG. 4 is a perspective diagram for partial configuration of an electronic device according to one embodiment of the present invention.

Referring to FIG. 4, the first and second microphones 221 and 222 can be disposed on the top side of the first case 201. And, the third and fourth microphones 223 and 224 can be disposed on the front side of the first case 201. Hence, the first and second microphones 221 and 222 may correspond to a top direction of the electronic device 200 and the third and fourth microphones 223 and 224 may correspond to a front direction of the electronic device 200.

In some implementations, the configuration of a plurality of the microphones of the microphone 220 is provided as one example for the description, by which the present invention is non-limited. Hence, the microphone 220 can be disposed on various positions of the electronic device 200 and may include a plurality of microphones.

Figure 5:
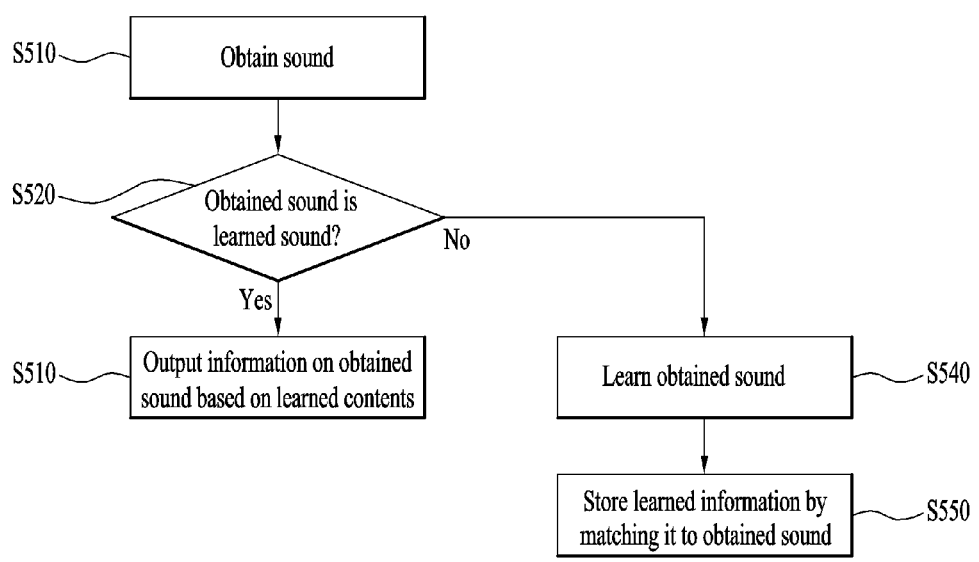
FIG. 5 is a flowchart for a method of controlling an electronic device according to various embodiments of the present invention.

FIG. 5 is a flowchart for a method of controlling an electronic device according to various embodiments of the present invention.

Referring to FIG. 5, the electronic device 200 can obtain various sounds through the microphone 220 [S510].

For instance, the controller 280 of the electronic device 200 can obtain various sounds through the microphone 220.

The electronic device 200 can obtain sounds of various frequency bands through the microphone 200 and also obtain sounds of inaudible frequency bands as well as sounds of audible frequency bands.

In particular, the electronic device 200 can obtain sound generated from the surroundings of the electronic device 200. For example, the electronic device 200 can obtain a notification sound generated from another device nearby through the microphone 220.

Through the microphone 220, the electronic device 200 may obtain a sound generated from a space different from the space at which the electronic device 200 is located. For example, through the microphone 220, the electronic device 200 can obtain a sound generated from an outdoor space as well as from an indoor space in which the electronic device 200 is located. The microphone 220 may be provided to the electronic device 200. Alternatively, the microphone 220 may be separated from the electronic device 200. For example, the microphone 220 may be provided to each predetermined space by being separated from the electronic device 200. The electronic device 200 may obtain sounds from a plurality of the microphones 220 located at different places. For one example, the microphone 220 may be provided to each predetermined space in an inner space or transmit the obtained sound to the electronic device 200. For another example, the microphone 220 may transmit the obtained sound to the electronic device 200 through Internet of Things (IoT). Thus, the electronic device 200 can receive the obtained sounds without restriction put on a physical distance or space.

The electronic device 200 may determine whether the obtained sound is a learned sound [S520].

For instance, the controller 280 of the electronic device 200 can determine whether a sound obtained through the microphone 220 is an already0learned sound. Here, the learned sound may mean a sound for which information on the obtained sound exists.

The electronic device 200 may determine whether the obtained sound is the learned sound in various ways.

For one example, the electronic device 200 can determine whether information on an obtained sound is stored in the storage unit 270. For instance, the controller 280 can determine whether information corresponding to an audio signal waveform of an obtained sound is stored in the storage unit 270.

For another example, the controller 280 can determine whether information on an obtained sound is stored in an external server (not shown). For instance, the controller 280 sends a query about information corresponding to an audio signal waveform of an obtained sound to an external server (not shown), and is then able to determine whether the information on the obtained sound is stored in the external server (not shown) through answer to the query.

For further example, the controller 280 can determine whether information on an obtained sound is stored in the storage unit 270 or an external server (not shown). For instance, the controller 280 determines whether information corresponding to an audio signal waveform of an obtained sound is stored in the storage unit 270. If the information is not stored in the storage unit 270, the controller 280 can send a query to the external server (not shown), thereby determining whether the information on the obtained sound is stored therein.

Moreover, if information on an obtained sound stored in the storage unit 270 and information on the obtained sound stored in the external server (not shown) are different from each other, the controller 280 can determine which information is a correct information and modify the incorrect information stored in the storage unit 270 or the external server (not shown) into the correct information.

If the obtained sound is the learned sound, the electronic device 200 can output the information on the obtained sound based on the learned contents [S530].

For instance, if the obtained sound is the learned sound and the information on the obtained sound is a stored sound, the controller 280 of the electronic device 200 can output the stored information on the obtained sound. For one example, the controller 280 can display the information on the obtained sound on the display unit 251 and output the corresponding information through the audio output unit 252. For another example, the controller 280 may send the information on the obtained sound to a different device and enable to the different device to output the information on the obtained sound.

Here, the learned contents may mean various informations stored for the obtained sound.

For instance, the learned contents for the obtained sound may include a notification content according to a specific operation or function of another device or a unique information indicating a specific user or device.

Moreover, the learned contents for the obtained sound may include contents for natural or artificial phenomena.

For instance, the learned contents for the obtained sound may include information on sounds attributed to natural phenomena such as rain, thunder and the like or information on sounds attributed to artificial phenomena such as siren, warning sound and the like.

An example of an output of information on an obtained sound of the electronic device 200 is described with reference to FIG. 6 and FIG. 7 as follows.

Figure 6:
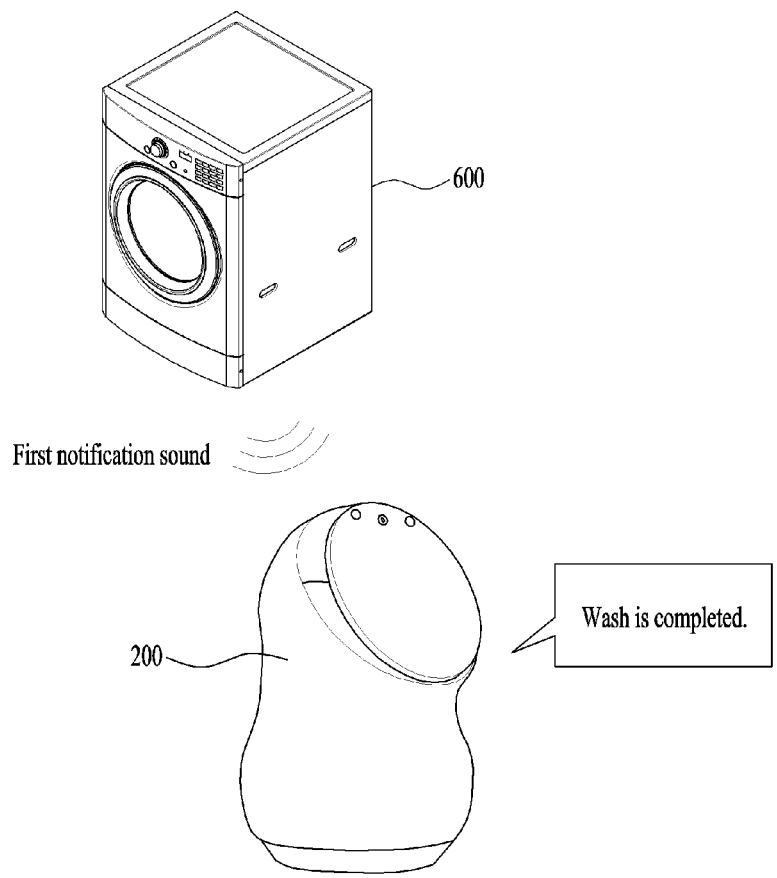
FIG. 6 and FIG. 7 are diagrams for the concept of an output of information on an obtained sound according to various embodiments of the present invention.
Figure 7:
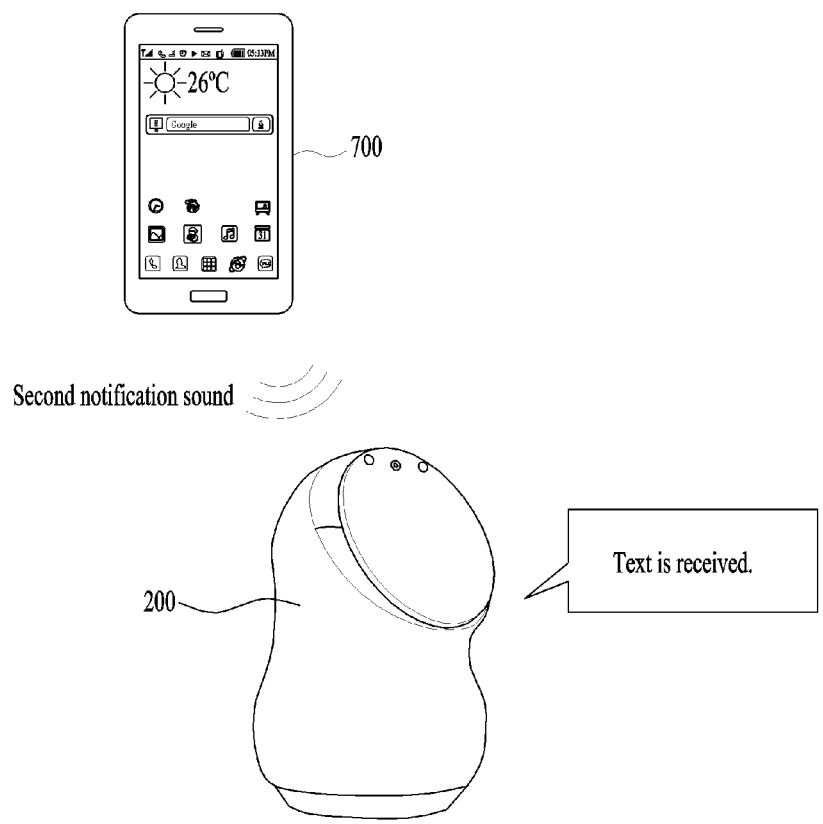

FIG. 6 and FIG. 7 are diagrams for the concept of an output of information on an obtained sound according to various embodiments of the present invention.

Referring to FIG. 6, the electronic device 200 may obtain a first notification sound outputted by a washer 600 and then output information on the obtained first notification sound. Particularly, the microphone 220 may obtain the first notification sound outputted by the washer 600 and the controller 280 may determine whether the obtained first notification sound is a learned sound. For instance, the controller 280 can determine whether the information on the obtained first notification sound is stored in the storage unit 270 and put a query to an external server (not shown). The controller 280 may obtain the information on the obtained first notification sound from the storage unit 270 or the external server (not shown).

For example, based on the information on the obtained first notification sound, the electronic device 200 can output a message indicating that the washer 600 completed the wash if the first notification sound is a wash complete notification sound. For instance, the controller 280 can display the message indicating that the washer 600 completed the wash on the display unit 251 and output an audio indicating that the washer 600 completed the wash to the audio output unit 252. And, the controller 280 may control another device to output the message indicating that the washer 600 completed the wash.

Referring to FIG. 7, the electronic device 200 may obtain a second notification sound outputted by a terminal 700 and then output information on the obtained second notification sound. Particularly, the microphone 220 may obtain the second notification sound outputted by the terminal 700 and the controller 280 may determine whether the obtained second notification sound is a learned sound. For instance, the controller 280 can determine whether the information on the obtained second notification sound is stored in the storage unit 270 and put a query to an external server (not shown). The controller 280 may obtain the information on the obtained second notification sound from the storage unit 270 or the external server (not shown).

For example, based on the information on the obtained second notification sound, the electronic device 200 can output a message indicating that the terminal 700 received a message if the second notification sound is a message reception notification sound. For instance, the controller 280 can display the message indicating that the terminal 700 received the message on the display unit 251 and output an audio indicating that the terminal 700 received the message to the audio output unit 252. And, the controller 280 may control another device to output the message indicating that the terminal 700 received the message.

Thus, the electronic device 200 can obtain a notification sound outputted by another device and output information on the meaning indicated by the obtained notification sound.

FIG. 5 is referred to again.

If the obtained sound is not the learned sound, the electronic device 200 can learn the obtained sound [S450].

Here, if the electronic device 200 learns the obtained sound, it may mean that information on the obtained sound is obtained.

For example, the electronic device 200 puts a query about the information on the obtained sound to a user and is able to learn the obtained sound based on a user's response to the query. This is described with reference to FIGS. 8 to 10.

Figure 8:
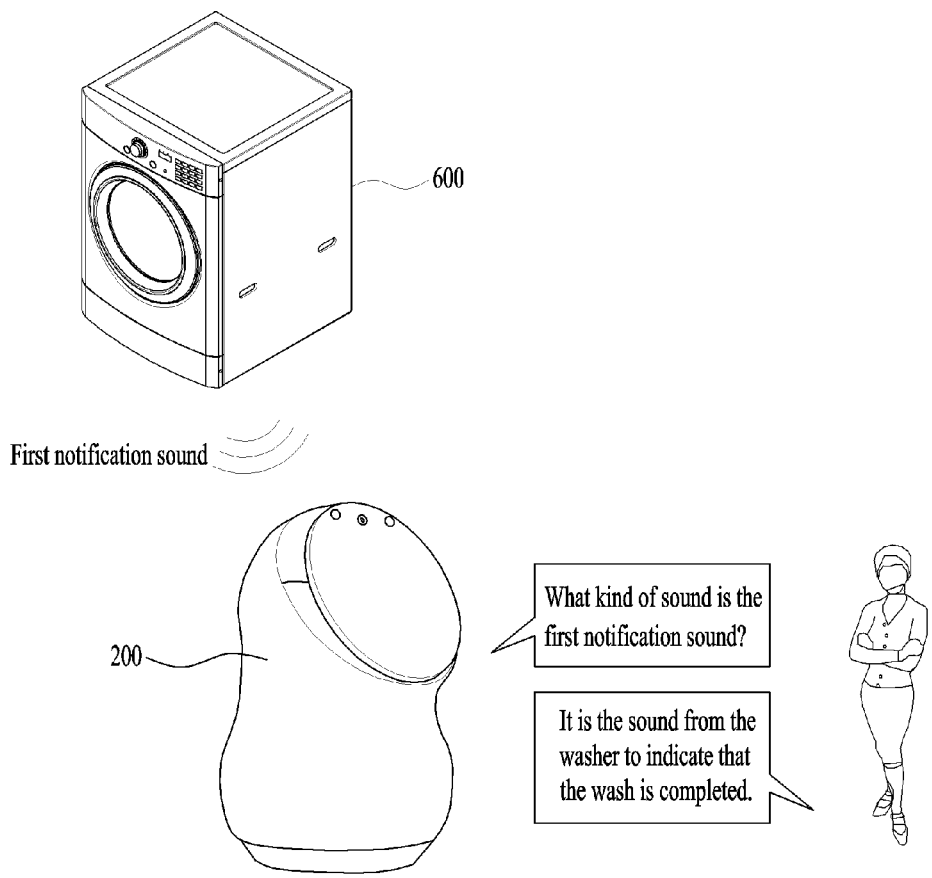
FIGS. 8 to 10 are diagrams for the concept of the learning through a query according to various embodiments of the present invention.
Figure 9:
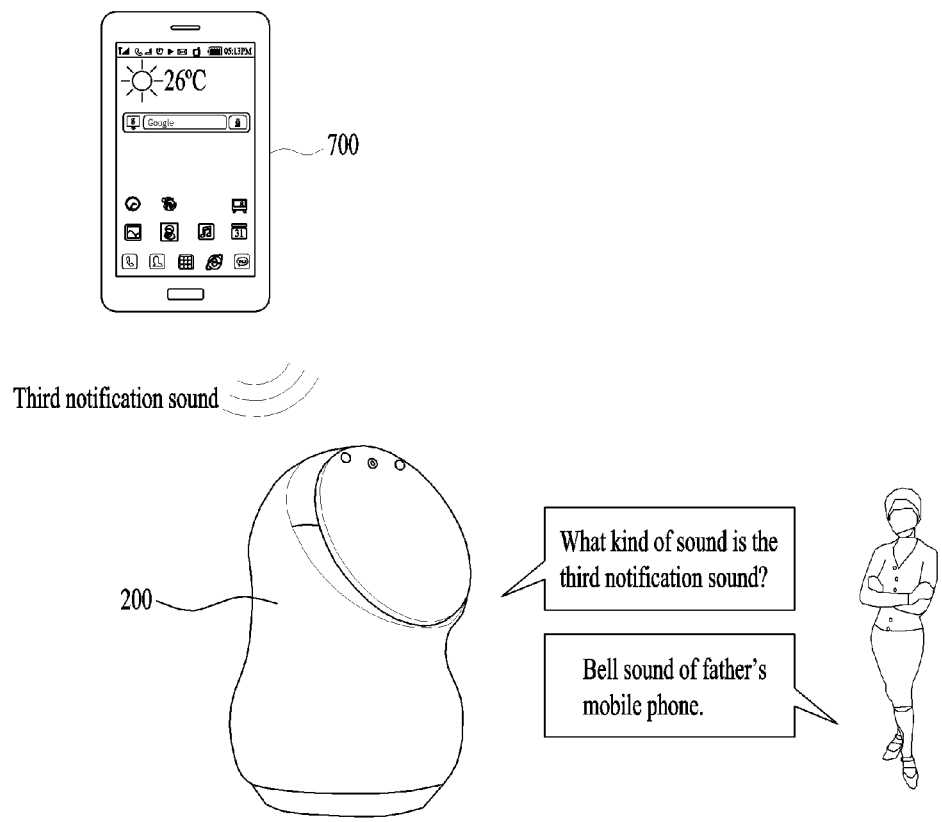
Figure 10:
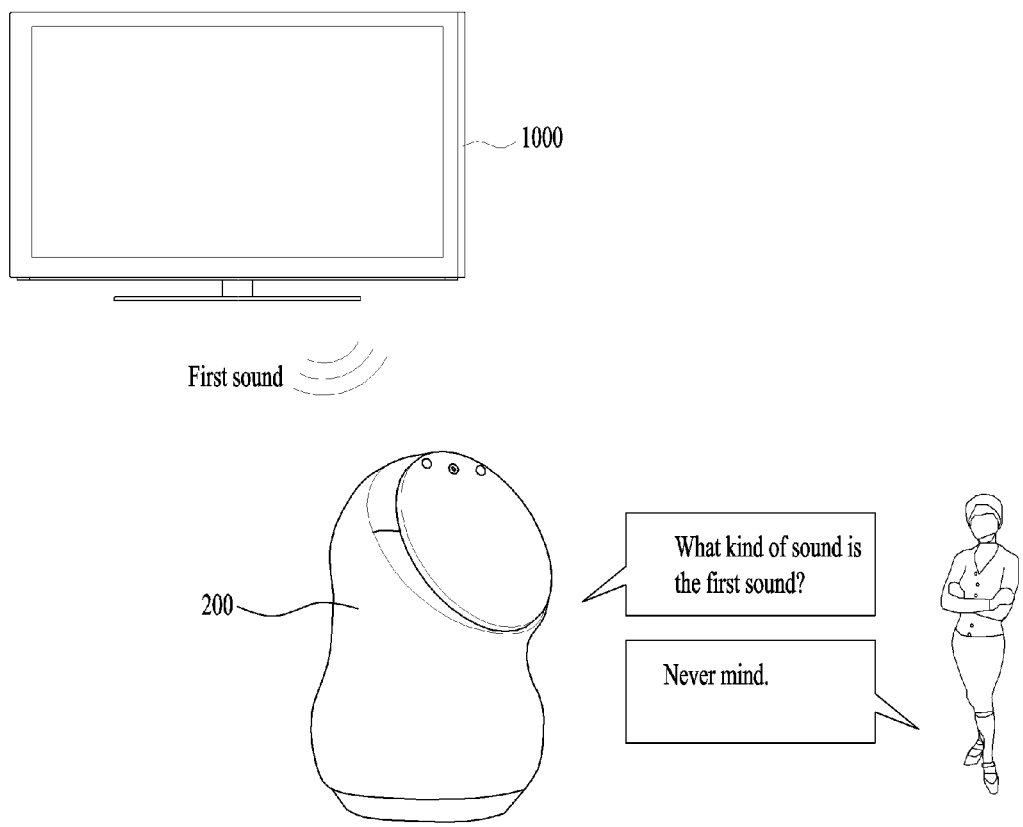

FIGS. 8 to 10 are diagrams for the concept of the learning through a query according to various embodiments of the present invention.

Referring to FIG. 8, the electronic device 200 may obtain a first notification sound outputted by a washer 600 and determine whether the obtained first notification sound is a learned sound. If the first notification sound is not the learned sound, the electronic device 200 can put a query about the first notification sound to a user. Based on an answer to the query from the user, the electronic device 200 can learn the first notification sound. For instance, the electronic device 200 can put a query about what kind of sound the first notification sound is to the user through at least one of the display unit 251 and the audio output unit 252. And, the electronic device 200 can obtain information on the first notification sound from the user through the microphone 220 or another device. For example, the electronic device 200 can obtain information, which indicates that the first notification sound is a wash complete notification sound of the washer 600, from the user. Therefore, the electronic device 200 can learn the obtained first notification sound.

Referring to FIG. 9, the electronic device 200 may obtain a third notification sound outputted by a terminal 700 and determine whether the obtained third notification sound is a learned sound. If the third notification sound is not the learned sound, the electronic device 200 can put a query about the third notification sound to a user. Based on an answer to the query from the user, the electronic device 200 can learn the third notification sound. For instance, the electronic device 200 can put a query about what kind of sound the third notification sound is to the user through at least one of the display unit 251 and the audio output unit 252. And, the electronic device 200 can obtain information on the third notification sound from the user through the microphone 220 or another device (not shown). For example, the electronic device 200 can obtain information, which indicates that the third notification sound is a bell sound of a terminal owned by a user's father, from the user. Therefore, the electronic device 200 can learn the obtained third notification sound.

Referring to FIG. 10, the electronic device 200 may obtain a first sound outputted by a video display device 1000 and determine whether the obtained sound is a learned sound. If the first sound is not the learned sound, the electronic device 200 can put a query about the first sound to a user. Based on an answer to the query from the user, the electronic device 200 can learn the first sound. For instance, the electronic device 200 can put a query about what kind of sound the first sound is to the user through at least one of the display unit 251 and the audio output unit 252. And, the electronic device 200 can obtain information on the first sound from the user through the microphone 220 or another device. For example, the electronic device 200 can obtain information, which indicates that the first sound is a sound of a content outputted from the video display device 1000, from the user or may obtain special information or information indicating that the first sound is a meaningless sound. Therefore, the electronic device 200 can learn the obtained first sound and also learn that prescribed information on the first sound may not be outputted.

As described above, when the electronic device 200 does not have information on an obtained sound and fails to learn the obtained sound, the electronic device 200 may put a query about the obtained sound to a user and then learn the obtained sound based on an answer to the query.

For another example, based on a user's response to an obtained sound, the electronic device 200 can obtain information on the obtained sound. This is described with reference to FIG. 11 and FIG. 12.

Figure 11:
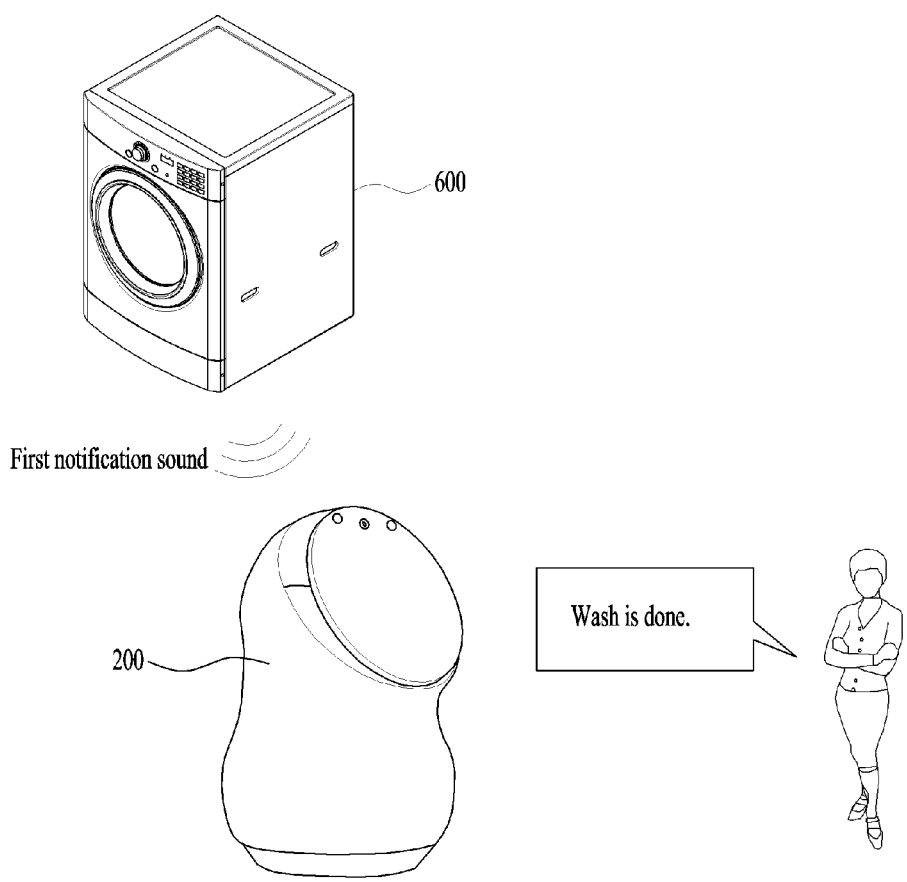
FIG. 11 and FIG. 12 are diagrams for the concept of the learning through a user response according to various embodiments of the present invention.
Figure 12:
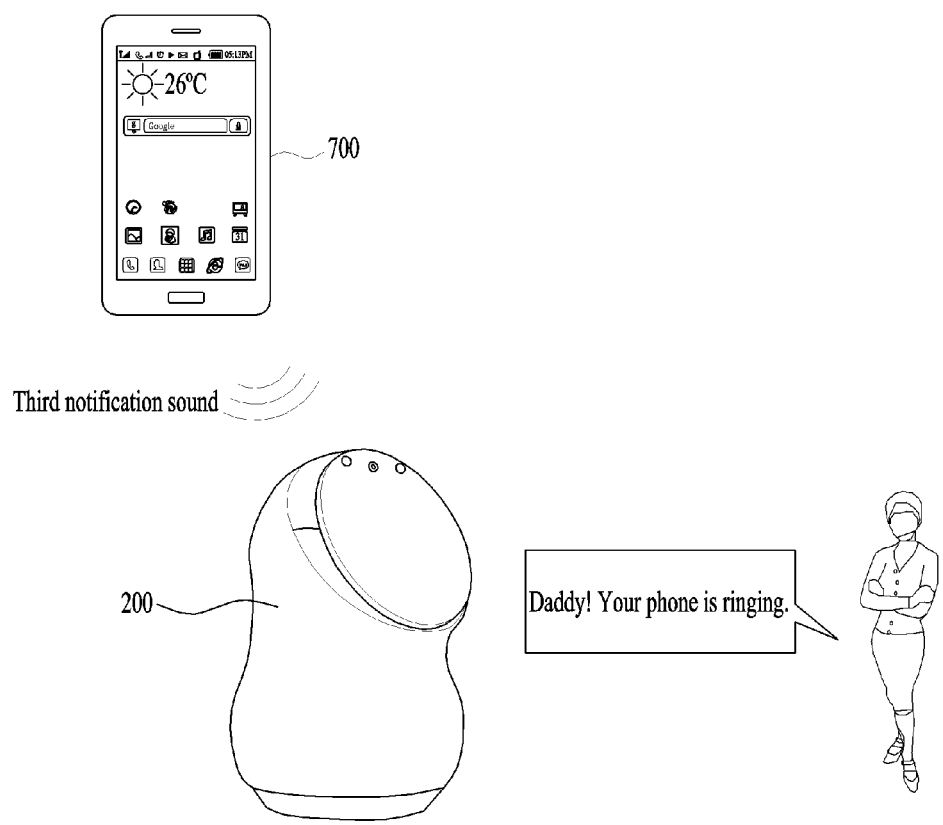

FIG. 11 and FIG. 12 are diagrams for the concept of the learning through a user response according to various embodiments of the present invention.

Referring to FIG. 11, the electronic device 200 may obtain a first notification sound outputted by a washer 600 and determine whether the obtained first notification sound is a learned sound. If the first notification sound is not the learned sound, the electronic device 200 may collect a user response to the first notification sound. Based on the user response to the first notification sound, the electronic device 200 can learn the first notification sound. For instance, the electronic device 200 can collect a user response to the first notification sound through at least one of the microphone 220 and the camera 229. For example, the electronic device 200 can obtain words spoken by a user in response to the first notification sound and then obtain information indicating that the first notification sound is a wash complete notification sound of the washer 600 based on the obtained words. Moreover, the electronic device 200 captures a user's action of hanging out the laundry after hearing the first notification sound is then able to obtain information indicating that the first notification sound is a wash complete notification sound of the washer 600 based on the captured image. Therefore, the electronic device 200 can learn the obtained first sound.

Referring to FIG. 12, the electronic device 200 may obtain a third notification sound outputted by a terminal 700 and determine whether the obtained third notification sound is a learned sound. If the third notification sound is not the learned sound, the electronic device 200 may collect a user response to the third notification sound. Based on the user response to the third notification sound, the electronic device 200 can learn the third notification sound. For instance, the electronic device 200 can collect a user response to the third notification sound through at least one of the microphone 220 and the camera 229. For example, the electronic device 200 can obtain words spoken by a user in response to the third notification sound and then obtain information indicating that the third notification sound is a bell sound of the terminal 700 owned by a user's father based on the obtained words. Moreover, the electronic device 200 captures a user's action of delivering the terminal 700 to the father after hearing the third notification sound is then able to obtain information indicating that the third notification sound is the bell sound of the terminal 700 based on the captured image. Therefore, the electronic device 200 can learn the obtained third sound.

In some implementations, if information on an obtained sound is not learned, the electronic device 200 can learn the obtained sound based on a user response. If accuracy of a content learned on the basis of the user response is equal to or lower than a predetermined level, the electronic device 200 can put an additional query to the user and then obtain an answer, thereby raising accuracy of the learned content.

Figure 13:
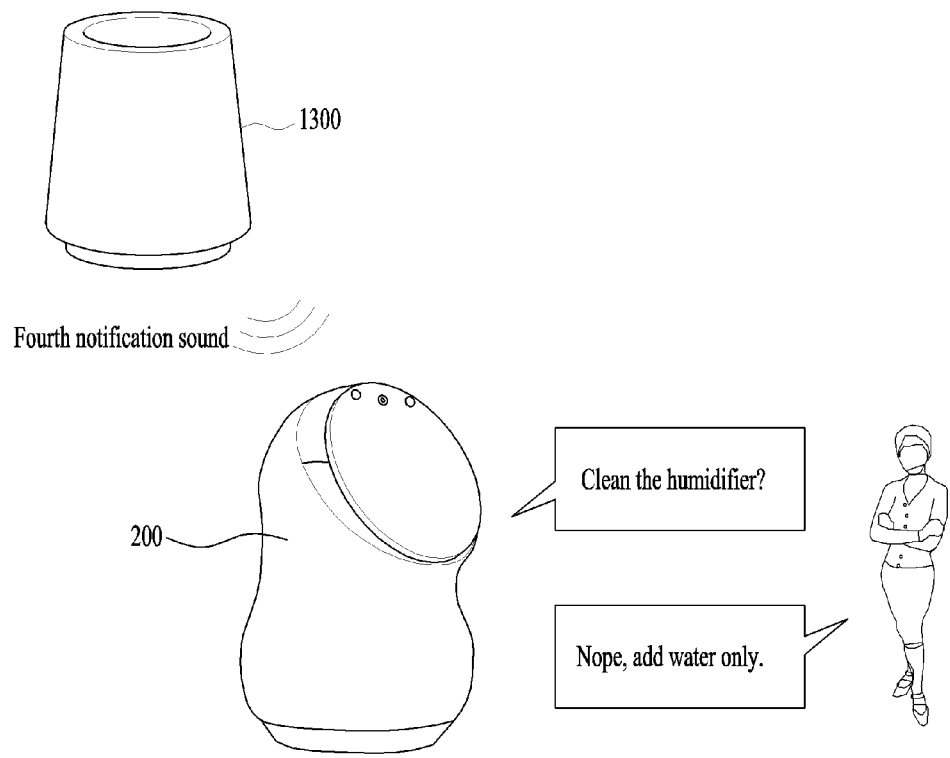
FIG. 13 is a diagram for the concept of the learning through an additional query according to one embodiment of the present invention.

FIG. 13 is a diagram for the concept of the learning through an additional query according to one embodiment of the present invention.

Referring to FIG. 13, the electronic device 200 may obtain a fourth notification sound outputted by a humidifier 1300 and determine whether the obtained fourth notification sound is a learned sound. If the fourth notification sound is not the learned sound, the electronic device 200 may collect a user response to the fourth notification sound. Based on the user response to the fourth notification sound, the electronic device 200 can learn the fourth notification sound. For instance, the electronic device 200 can collect a user response to the fourth notification sound through at least one of the microphone 220 and the camera 229. For example, the electronic device 200 captures a user's action of adding water to the humidifier 1300 after hearing the fourth notification sound is then able to obtain information indicating that the fourth notification sound is a notification for cleaning the humidifier 1300 or adding water to the humidifier 1300 based on the captured image. In order to raise the accuracy of the learned information, the electronic device 200 can put an additional query about the fourth notification sound to the user. For instance, the electronic device 200 can put an additional query about whether the fourth notification sound is a notification for cleaning the humidifier 1300 to the user and then obtain information indicating a water-adding notification in response to the additional query. Therefore, the electronic device 200 can learn the obtained fourth sound.

As described above, when the electronic device 200 does not have information on an obtained sound and fails to learn the obtained sound, the electronic device 200 may collect a user response to the obtained sound and then learn the obtained sound based on the collected response.

The electronic device 200 according to various embodiments of the present invention can obtain information on an obtained sound based on a query and answer with a server 1400 connected thereto through a network. This is described with reference to FIG. 14.

Figure 14:
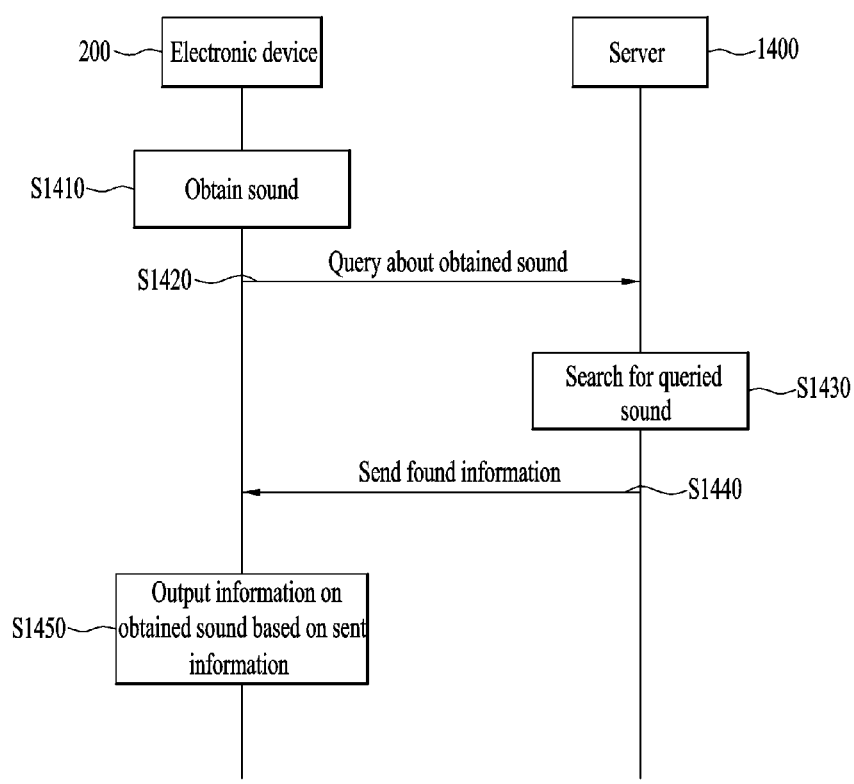
FIG. 14 is a flowchart showing an operating method of an electronic device according to various embodiments of the present invention.

FIG. 14 is a flowchart showing an operating method of an electronic device according to various embodiments of the present invention.

Referring to FIG. 14, the electronic device 200 may obtain a sound [S1410]. This is already described above and its details shall be omitted.

In order to obtain information on the obtained sound, the electronic device 200 may put a query about the obtained sound to a server 1400 [S1420]. For instance, the electronic device 200 can make a request for information on the obtained sound to the server 1400 through the communication unit 210.

The server 1400 can search for a sound queried from the electronic device 200 [S1430]. For instance, the server 1400 can search for the information on the sound queried from the electronic device 200.

If the information on the queried sound is found, the server 1400 can send the found information to the electronic device 200 [S1440]. Based on the information sent from the server 1400, the electronic device 200 can output the information on the obtained sound [S1450]. This is mentioned in the foregoing description and its details shall be omitted.

If failing to obtain the information on the obtained sound from the server 1400, the electronic device 200 can obtain information through learning and then enable the server 1400 to store the information on the obtained sound by sending the obtained information to the server 1400.

Figure 15:
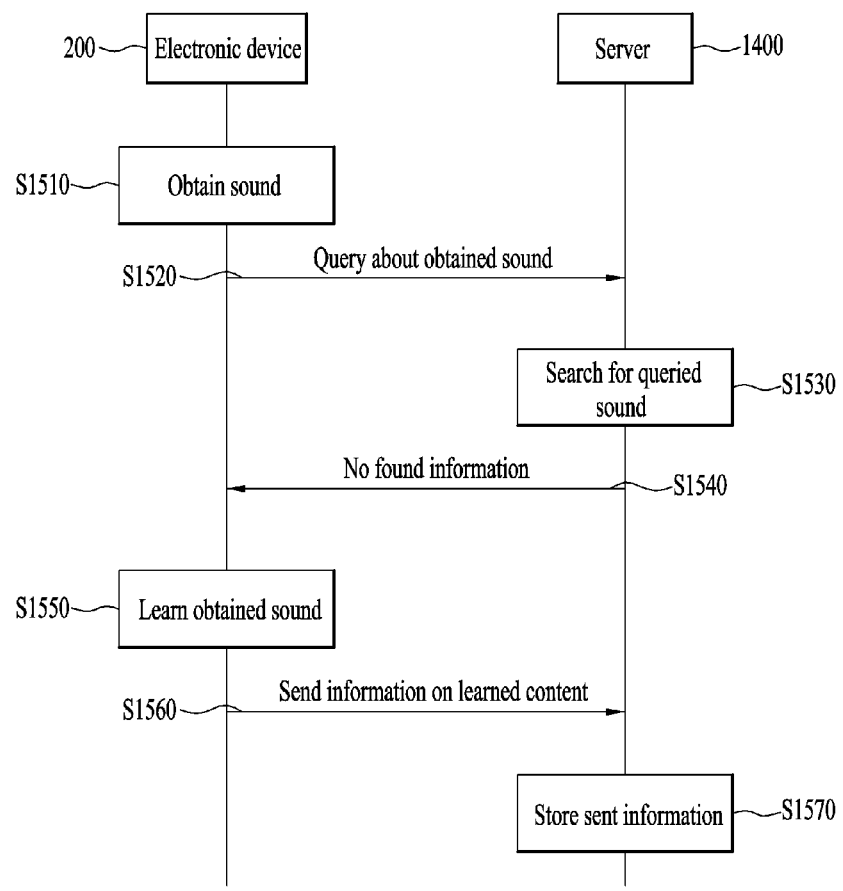
FIG. 15 is a flowchart showing an operating method of an electronic device according to various embodiments of the present invention.

FIG. 15 is a flowchart showing an operating method of an electronic device according to various embodiments of the present invention.

Referring to FIG. 15, the electronic device 200 may obtain a sound [S1510]. In order to obtain information on the obtained sound, the electronic device 200 may put a query about the obtained sound to a server 1400 [S1520]. The server 1400 can search for a sound queried from the electronic device 200 [S1530]. If the information on the sound queried is not found, the server 1400 can inform the electronic device 200 that there is no found information [S1540].

The electronic device 200 can learn the obtained sound [S1550].

Since the electronic device 200 fails to obtain the information on the obtained sound, the electronic device 200 can learn the obtained sound. As the learning of the electronic device 200 is mentioned in the foregoing description, its details shall be omitted.

The electronic device 200 can send information on the learned content to the server 1400 [S1560]. Hence, the server 1400 can add the information on the sound of which information is not found. Since the server 1400 can be provided with information on a sound from each of a plurality of the electronic devices 200, it is able to store information on various sounds.

The electronic device 200 according to various embodiments of the present invention can determine whether information on an obtained sound is information for a specific user and then output the information on the obtained sound as a directional or non-directional sound.

Figure 16:
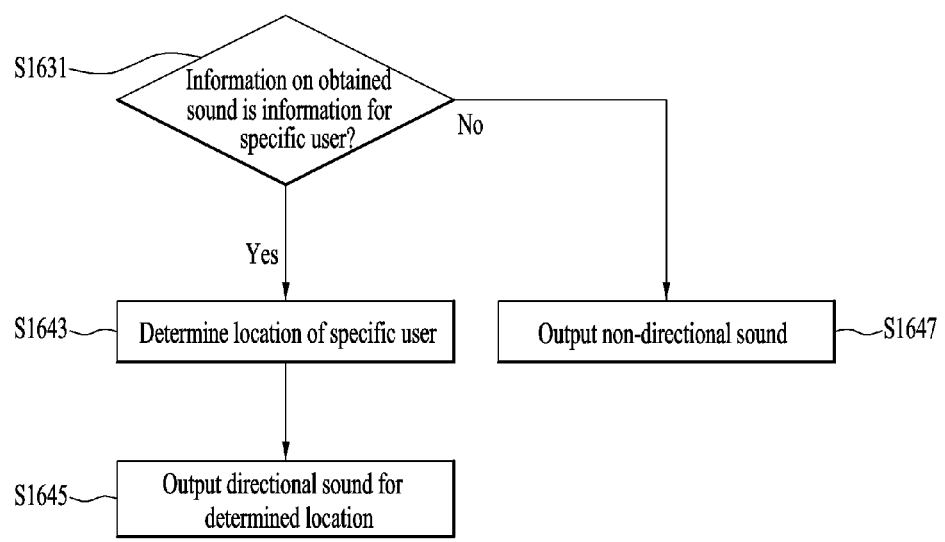
FIG. 16 is a flowchart showing an operating method of an electronic device according to various embodiments of the present invention.

FIG. 16 is a flowchart showing an operating method of an electronic device according to various embodiments of the present invention.

Referring to FIG. 16, the electronic device 200 can determine whether information on an obtained sound is information for a specific user [S1631].

For instance, when the information on the obtained sound is outputted, the controller 280 of the electronic device 200 may determine whether information to be outputted is information for all users or information for a specific user. Here, the information for the specific user may mean information the specific user needs to be informed of.

If determining that the information on the obtained sound is the information for the specific user, the electronic device 200 may determine a location of the specific user [S1643].

For instance, the controller 280 of the electronic device 200 may determine a location of the specific user based on an image obtained through the camera 220 or an audio obtained through the microphone 220.

The electronic device 200 may output information on the determined location as a directional sound [S1645].

For instance, regarding the determined location of the specific user, the controller 280 of the electronic device 200 can output the information on the obtained sound as a directional sound.

Moreover, the electronic device 200 may move to the determined location and then output the information on the obtained sound to the specific user.

If determining that the information on the obtained sound is not the information for the specific user, the electronic device 200 may output the information on the obtained sound as a non-directional sound [S1647].

In some implementations, the operation for the electronic device 200 to output the obtained information as the directional or non-directional sound may include an operation of when a user is unable to recognize a notification sound of another device due to surrounding noise, delivering the corresponding notification to the user. Hence, if determining that the user fails to recognize the notification of another device due to the surrounding noise, the electronic device 200 can provide the user with the information as the directional or non-directional sound through the aforementioned process.

Moreover, the electronic device 200 may continue to output the information on the obtained sound until the user makes a response that the user has recognized the information.

The electronic device 200 according to various embodiments of the present invention may obtain a plurality of sounds and then output information on each of a plurality of the obtained sounds. Hence, if simultaneously obtaining a plurality of notification sounds or a plurality of similar notification sounds, the electronic device 200 can output information on each of a plurality of the notification sounds.

If an obtained sound includes a sound having no special information, the electronic device 200 may indicate that the obtained sound will be ignored. For instance, although an obtained sound is identical to a notification sound of a different device, if the obtained sound is a sound of a content outputted from a video display device, a sound for a different user, or a sound currently outputted from a different region, the electronic device 200 may indicate that the obtained sound will be ignored. Moreover, if obtaining information indicating that the obtained sound is a sound having no special information, the electronic device 200 may indicate that the obtained sound will be ignored.

The electronic device 200 according to various embodiments of the present invention can store an obtained sound and information on the obtained sound and provide a storage history. For instance, the electronic device 200 can output a history indicating an obtained sound and information on the obtained sound per time slot. For another instance, the electronic device 200 may output a history indicating an obtained sound and information on the obtained sound per similar sound. For further instance, the electronic device 200 may output a history indicating an obtained sound and information on the obtained sound per category of information on an obtained sound.

The electronic device 200 according to various embodiments of the present invention can determine a location of each of a plurality of external devices that are a plurality of different devices and output information on an obtained sound based on the determined location of each of a plurality of the external devices. And, the electronic device 200 may learn the obtained sound based on the determined location of each of a plurality of the external devices. For instance, the electronic device 200 can determine a location of an external device based on at least one of an obtained sound, a captured image, information according to communication with an external device, and settings according to a user input. Based on the determined location of each of a plurality of the external devices, the electronic device 200 can determine an external device corresponding to the obtained sound and information on the obtained sound and then output information according to a result of the determination. Moreover, regarding a sound outputted from at least one of a plurality of the determined external devices, the electronic device 200 can determine the corresponding sound as a sound outputted by the determined external device and then learn the obtained sound.

For one example, based on at least one of an obtained sound, a captured image, information according to communication with an external device, and settings according to a user input, the electronic device 200 can determine that a washer 600 is located in a first direction of the electronic device 200 and also determine that a video display device 1000 is located in a second direction of the electronic device 200. When the electronic device 200 has learned that a first notification sound of the washer 600 is a notification sound according to wash completion and also has learned to ignore a sound outputted from the video display device 1000, if the electronic device 200 obtains the first notification sound in the second direction corresponding to the video display device 100, the electronic device 200 can determine that the obtained first notification sound is outputted from the video display device and should be ignored. Hence, the electronic device 200 can indicate that the first notification sound outputted from the video display device 1000 in the second direction shall be ignored.

For another example, if obtaining a first notification sound outputted from the washer 600 in the first direction, the electronic device 200 can determine that a sound outputted in the first direction is a sound outputted by the washer 600. Hence, the electronic device 200 can learn that the sound outputted in the first direction is the sound outputted by the washer 600 and also learn that the corresponding sound is a notification sound related to the washer 600. For instance, if obtaining a fifth notification sound in the first direction, the electronic device 200 can determine that the obtained sound is a sound outputted by the washer 600. And, the electronic device 200 can learn the fifth notification sound as information related to the washer 600. Such a learning operation of the electronic device 200 is already mentioned in the foregoing description and it details shall be omitted.

As described above, operations of determining a location according to a sound of an external device and outputting or learning information on a sound outputted from the determined location are applicable to an electronic device 200 of a mobile or portable type as well as to an electronic device 200 of a stationary or mounted type. Particularly, the mobile electronic device 200 can determine a location of an external device as an absolute location and output or learn information on a sound outputted from the determined absolute location. For instance, if the mobile electronic device 200 determines a location of an external device as a coordinate value according to reference coordinates or the like, the mobile electronic device 200 can determine a location of at least one external device as a coordinate value according to reference coordinates or the like and also determine a sound outputted from the determined coordinate value as a sound outputted by an external device located at the corresponding coordinate value. For the sound outputted from the corresponding coordinate value, the mobile electronic device 200 can output information related to the external device located at the corresponding coordinate value and learn information related to the external device located at the corresponding coordinate value.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

What is claimed is:

1. A method of a robot that includes a microphone and a camera, the method comprising:
   receiving, via the microphone, a sound outputted from an external device;
   determining whether the received sound is a learned sound;
   when the received sound is determined to not be the learned sound, capturing, via the camera, an image including a user's action;
   learning information on the received sound based on the captured image;
   comparing an accuracy of the learned information with a predetermined level;
   when the accuracy of the learned information is equal to or less than the predetermined level, outputting, via an output unit, a query sound about what kind of the received sound to the user;
   receiving, via the microphone, an answer sound of the user for the query sound;
   learning information on the received sound based on a response to the answer sound of the user; and
   outputting, via the output unit, the information on the received sound.

2. The method of claim 1, wherein the determining whether the received sound is the learned sound comprises determining whether the information on the received sound is stored in the robot or at a server.

3. The method of claim 1, further comprising:
   when the received sound is determined to not be the learned sound, monitoring a user's response to the received sound; and
   obtaining the information on the received sound based on the monitoring of the user's response.

4. The method of claim 3, wherein the obtaining of the information on the received sound based on the monitoring of the user's response comprises:
   providing, to the user, an additional query about at least one information obtained according to the monitoring of the user's response; and
   obtaining the information on the received sound based on a response to the additional query.

5. A robot, comprising:
   an output unit configured to output a sound;
   a camera configured to capture an image;
   a microphone configured to receive a sound outputted from an external device; and
   a controller configured to:
      determine whether the received sound is a learned sound,
      when the received sound is determined to not be the learned sound, capture the image including a user's action via the camera,
      learn information on the received sound based on the captured image,
      compare an accuracy of the learned information with a predetermined level,
      when the accuracy of the learned information is equal to or less than the predetermined level, cause the output unit to output a query sound about what kind of the received sound to the user,
      receive, via the microphone, an answer sound of the user for the query sound,
      learn information on the received sound based on a response to the answer sound of the user, and
      cause the output unit to output the information on the received sound.

6. The robot of claim 5, wherein the controller is configured to determine whether the information on the received sound is stored in the robot or a server.

7. The robot of claim 5, wherein the controller is configured to:
   when the received sound is determined to not be the learned sound, monitor a user's response to the received sound, and
   obtain the information on the received sound based on the monitoring of the user's response.

8. The robot of claim 7, wherein the controller is configured to:
   provide, to the user, an additional query about at least one information obtained according to the monitoring of the user's response, and
   obtain the information on the received sound based on a response to the additional query.

* * * * *